US010521942B2

United States Patent
DeBates et al.

(10) Patent No.: US 10,521,942 B2
(45) Date of Patent: Dec. 31, 2019

(54) LOW POWER VIRTUAL REALITY PRESENCE MONITORING AND NOTIFICATION

(71) Applicant: Motorola Mobility LLC, Chicago, IL (US)

(72) Inventors: Scott DeBates, Crystal Lake, IL (US); Douglas Lautner, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/698,202

(22) Filed: Sep. 7, 2017

(65) Prior Publication Data

US 2019/0073812 A1 Mar. 7, 2019

(51) Int. Cl.
| | | |
|---|---|---|
| *G06T 19/00* | (2011.01) | |
| *G06T 11/60* | (2006.01) | |
| *G01K 1/02* | (2006.01) | |
| *G01K 7/04* | (2006.01) | |
| *G08B 7/06* | (2006.01) | |

(52) U.S. Cl.
CPC .............. *G06T 11/60* (2013.01); *G01K 1/024* (2013.01); *G01K 7/04* (2013.01); *G06T 19/006* (2013.01); *G08B 7/06* (2013.01)

(58) Field of Classification Search
CPC ......... G06T 11/60; G06T 19/006; G08B 7/06; G01K 1/024; G01K 7/04
See application file for complete search history.

(56) References Cited

U.S. PATENT DOCUMENTS

| | | | | |
|---|---|---|---|---|
| 9,536,355 | B1* | 1/2017 | Kumar | G06T 19/006 |
| 2005/0012817 | A1* | 1/2005 | Hampapur | H04N 7/181 |
| | | | | 348/143 |
| 2012/0320086 | A1* | 12/2012 | Kasama | H04N 5/2258 |
| | | | | 345/629 |
| 2014/0267311 | A1* | 9/2014 | Evertt | G06F 3/011 |
| | | | | 345/473 |
| 2018/0053055 | A1* | 2/2018 | Finding | G06K 9/00671 |

\* cited by examiner

*Primary Examiner* — Diane M Wills
(74) *Attorney, Agent, or Firm* — McKinney Phillips LLC; Phillip Pippenger

(57) ABSTRACT

Systems and methods for low power virtual reality (VR) presence monitoring and notification via a VR headset worn by a user entail a number of aspects. In an embodiment, a person is detected entering a physical location occupied by the user of the VR headset during a VR session. This detection may occur via one or more sensors on the VR headset. In response to detecting that a person has entered the location, a representation of the person is generated and displayed to the user via the VR headset as part of the VR session. In this way, the headset user may be made aware of people in their physical environment without leaving the VR session.

18 Claims, 6 Drawing Sheets

LOW POWER VIRTUAL REALITY PRESENCE MONITORING AND NOTIFICATION

TECHNICAL FIELD

The present disclosure is related generally to virtual reality and, more particularly, to systems and methods for enhancing a virtual reality display using one or more nearby physically present persons.

BACKGROUND

Virtual Reality (VR) technology allows users to experience a more immersive environment when playing games, training, and performing other simulated activities. The VR headsets are worn by the user for a full experience, but these headsets, by design, also isolate the user from their physical surroundings. While isolation limits unwanted interference from the physical environment, it also reduces a user's awareness of things in their surroundings that may actually warrant their attention.

The inventors have considered that it may be possible for a VR headset to use a mobile phone to monitor the user's physical surroundings via the phone's camera. However, this potential solution, while novel and interesting, would likely reduce device battery life, and may also cause the device to overheat as the camera, GPU, display, and host processor would all be running at high capacity.

Before proceeding to the remainder of this disclosure, it should be appreciated that the disclosure may address some of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, the inventors have determined that while VR technology allows a user to experience a more immersive environment, typical VR headsets tend to reduce or eliminate the user's awareness of objects or occurrences in their surroundings that may warrant their attention.

As a principal example, consider the case of another person entering a room where one or more users are wearing VR headsets and engaged in a VR experience. The immersive nature of the VR headsets will likely prevent the users from noticing the presence of the person who has entered. If the additional person then does something to get the attention of a VR user, such as by tapping the user's shoulder or speaking loudly, the VR user will likely be startled and disturbed. Such a disturbance will likely ruin the VR experience of one or both users, and cause a potentially negative reaction toward the additional person.

In an embodiment of the described principles, one or more thermalpile sensors located at the top of the virtual reality headset allow the headset to detect the approach of another person while the user is immersed in VR. In an embodiment, the thermalpile sensors and associated hardware or software are configured to detect the thermal signature of a human or animal (referred to herein as an "animate being"), and to then notify the VR user.

The notification may be, for example, an overlay of the thermal signature on the current VR display, enabling the headset to show the presence of others without destroying the VR experience. In a further embodiment, the user may be alerted using one or more speakers associated with the VR headset.

In yet another embodiment, a notification of the additional person is given by presenting an additional character or entity within the current VR scene being displayed by the headset. An additional option is to pause or stop the VR display and allow a camera view to be shown. This may use a phone camera or built-in headset camera. Another optional embodiment entails using thermalpile sensors to transform other local players into game action figures, with continued tracking motion.

With this overview in mind, and turning now to a more detailed discussion in conjunction with the attached figures, the techniques of the present disclosure are illustrated as being implemented in a suitable device environment. The following device description is based on embodiments and examples within which the disclosed principles may be implemented, and should not be taken as limiting the claims with regard to alternative embodiments that are not explicitly described herein.

Figure 1:
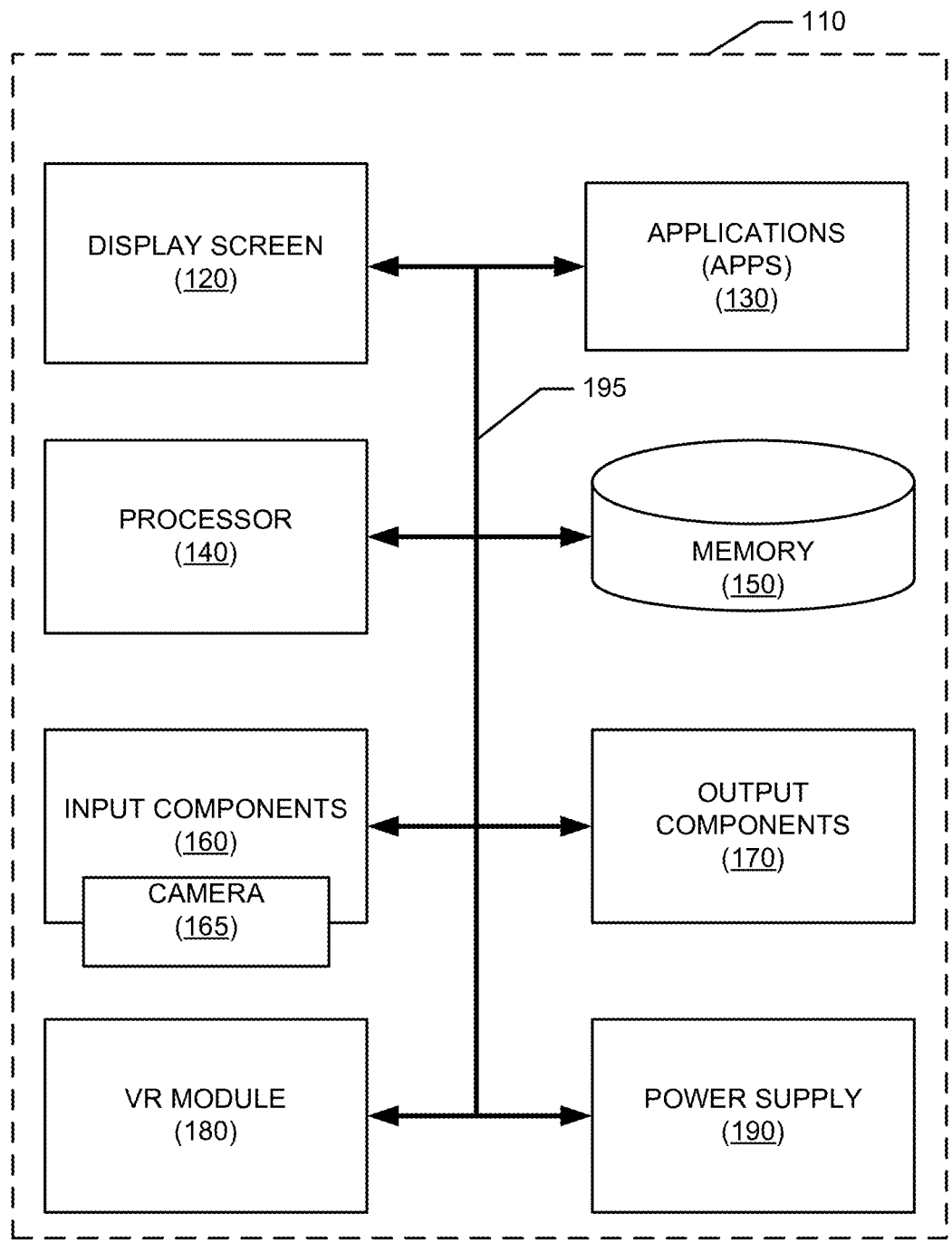
FIG. 1 is a modular view of an example electronic device usable in implementation of one or more embodiments of the disclosed principles.

Thus, for example, while FIG. 1 illustrates an example computing device with respect to which embodiments of the disclosed principles may be implemented, it will be appreciated that other device types may be used, including but not limited to laptop computers, tablet computers, and so on.

Figure 2:
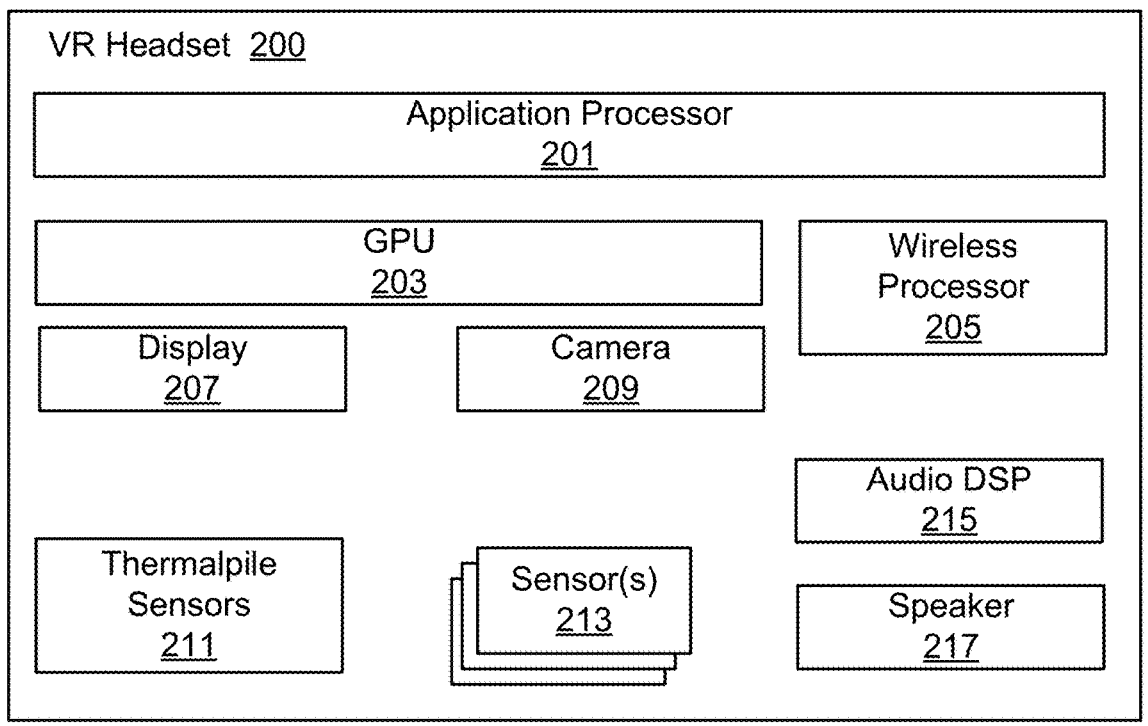
FIG. 2 is a modular view of an example virtual reality headset usable in implementation of one or more embodiments of the disclosed principles.

Moreover, FIG. 2 will be used to describe a further computing device in the form of a VR headset, which may be used to implement various of the disclosed embodiments.

The schematic diagram of FIG. 1 shows an exemplary mobile device 110 forming part of an environment within which aspects of the present disclosure may be implemented. In particular, the schematic diagram illustrates a user device 110 including example components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, cellular, etc. In an embodiment, the input components 160 include a camera as well as associated hardware and software modules (collectively 165).

The device 110 as illustrated also includes one or more output components 170 such as RF (radio frequency) or wired output facilities. The RF output facilities may similarly support any number of protocols, e.g., WiFi, Bluetooth, cellular, etc. and may be the same as or overlapping with the associated input facilities. It will be appreciated that a single physical input may serve for both transmission and receipt.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 is a nontransitory media that may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules such as a VR module 180, these typically utilize the operating system to provide more specific functionality, such as file system service and handling of protected and unprotected data stored in the memory 150. The VR module 180 is a software agent in an embodiment that manages the device 110's operations and interactions with respect to a VR headset. The VR headset will be shown in more detail later herein.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules (e.g., the VR module 180) and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

FIG. 2 shows the architecture of an example VR headset 200 in accordance with an embodiment of the described principles. In the illustrated embodiment, the VR headset 200 interacts with the user through a display 207 and a speaker 217. Additional elements include a graphics processing unit (GPU) 203, for advanced graphics generation and processing, as well as an audio digital signal processor (DSP) 215 for sound decoding and playback.

A camera 209 associated with the VR headset 200 allows the headset 200 to collect visual data regarding the physical surroundings during use of the headset 200. In addition, one or more thermalpile sensors 211 are included in the headset to detect heat signatures, such as those of a person or pet, in the physical space around the headset 200 during use.

The VR headset 200 includes a wireless processor 205 in the illustrated embodiment to connect the headset 200 to one or more other data sources or sinks, such as a game console, another headset, a mobile phone, etc. Finally, an application processor 201 executes the primary processes of the headset 200 by controlling the aforementioned components. Thus, for example, the application processor 201 may sample and respond to the thermalpile sensors 211, control the camera 209 and wireless processor 205, and execute the steps described herein.

It will be appreciated that the application processor 201 operates by reading computer-executable instructions from a nontransitory computer-readable medium and subsequently executing those instructions. The nontransitory computer-readable medium may include any or all of, or alternatives of, random access memory (i.e., Synchronous Dynamic Random Access Memory (SDRAM), Dynamic Random Access Memory (DRAM), RAMBUS Dynamic Random Access Memory (RDRM) or any other type of random access memory device or system) and read-only memory (i.e., a hard drive, flash memory or any other desired type of read-only memory device).

Figure 3:
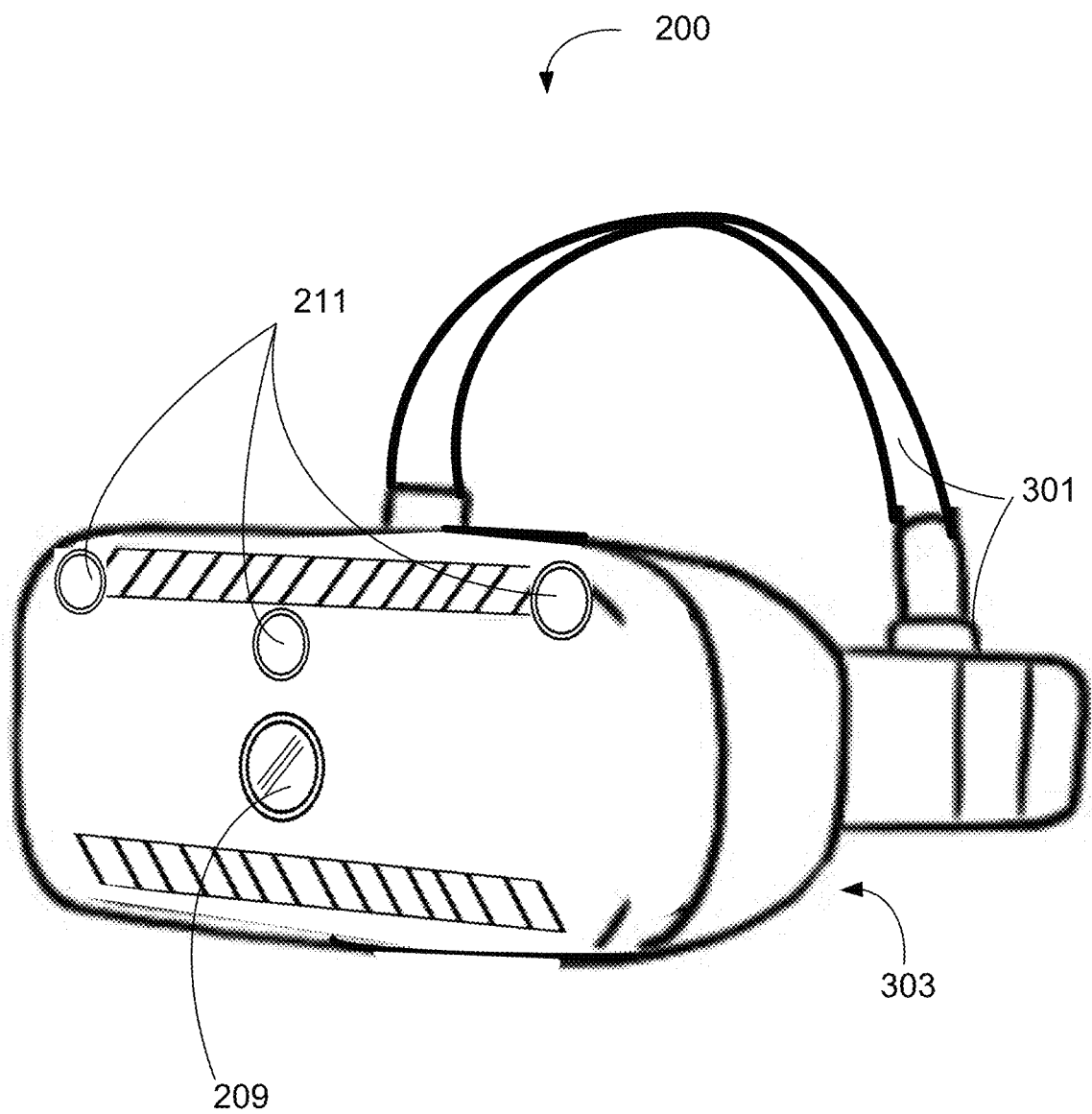
FIG. 3 is simplified perspective view of the virtual reality headset of FIG. 2.

Turning to FIG. 3, this figure shows a simplified schematic view of a VR headset 200 such as that of FIG. 2, in accordance with an embodiment of the disclosed principles. The illustrated headset 200 includes one or more straps 301 for attachment of the headset 200 to a user's head. A main body 303 of the headset 200 contains the remaining elements of the system and is located over the user's eyes when the VR headset 200 is worn.

Although not visible in FIG. 3, a display (FIG. 1, display 120) is located within the headset 200. The illustrated VR headset 200 further includes a camera 209 and one or more thermalpile sensors 211. Although not explicitly shown in FIG. 3, the outputs of the device (FIG. 1, output components 170) may include an audio output including one or more audio speakers. The illustrated VR headset 200 may be corded or wireless. When the VR headset 200 is wireless, the main body 303 further encloses a wireless transceiver and appropriate antenna facilities, and may have local or long-range connectivity, or both. For example, a VR headset 200 may support any of WiFi, Bluetooth, Cellular and other wireless protocols.

Figure 4:
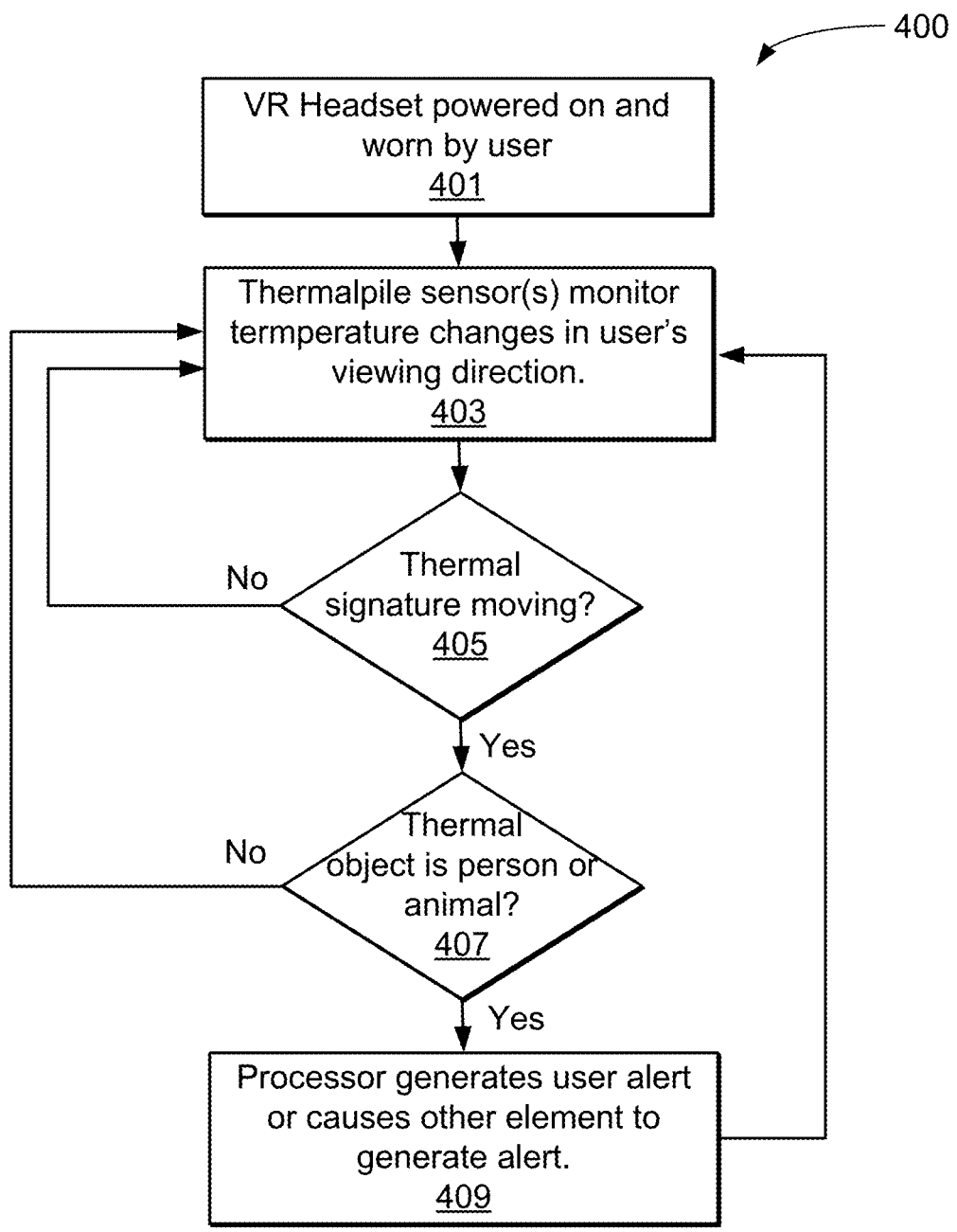
FIG. 4 is a flow chart showing a process of monitoring and notification in keeping with one or more embodiments of the disclosed principles.

Turning to FIG. 4, this figure provides a flow chart of an example process 400 executed by the VR headset 200 to track and react to objects in the user's physical environment during game play. It will be appreciated that additional steps may be added to the process or substituted for listed steps without departing from the scope of the described principles.

The process 400 begins with the VR headset 200 situated on the user's head with the main body 303 of the headset 200 over the user's eyes at stage 401. With the VR headset 200 powered on and being worn by the user, the processor 140 monitors the thermalpile sensors 211 at stage 403 for thermal activity in the vicinity of the user, that is, within range of the sensors 211 and in the direction of view. For example, a person or animal ("animate being") coming into the range of or coming into view of the thermalpile sensors 211 will cause a heat signal to be detected by the processor 140 through the sensors 211.

At stage 405 of the process 400, the processor 140 determines whether the detected thermal signature is moving spatially, e.g., causing a temporal change in the heat level sensed by one or more of the thermalpile sensors 211. For example, with three thermalpile sensors 211 arranged as shown in FIG. 3, a thermal object moving from the user's left to the user's right would result in an increasing sensed heat at the right-most sensor from the user's viewpoint. Depending upon where in the user's view frame the motion started, the other sensors 211 would show a corresponding increasing or decreasing heat level. Similarly, if no thermalpile sensor 211 senses a temporal change in heat level, the thermal object is likely not moving at that time.

Returning to stage 405, if it is determined that the detected thermal signature is not moving spatially, then the process 400 returns to stage 401 to continue to monitor the thermalpile sensors 211 for movement. Otherwise, the process 400 flows to stage 407, wherein the moving heat signature is analyzed to determine whether it exhibits characteristics of a human or animal.

For example, the heat signature of a human or animal moves smoothly and increases or decreases in size smoothly as a function of distance. In contrast, the heat signature of a hot air plume emitted from a radiator may exhibit rapid temperature fluctuation and may change dramatically in shape. Indeed, a heat plume may even divide into two or more entities depending upon prevailing air movements.

If it is determined at stage 407 that the moving heat signature does not exhibit characteristics of a human or animal, the process reverts to stage 401, wherein the processor 140 continues to monitor the thermalpile sensors 211 for movement. Otherwise, the process 400 continues on to stage 409 wherein the processor 140 generates a user alert or causes another element to generate such an alert.

Figure 5:
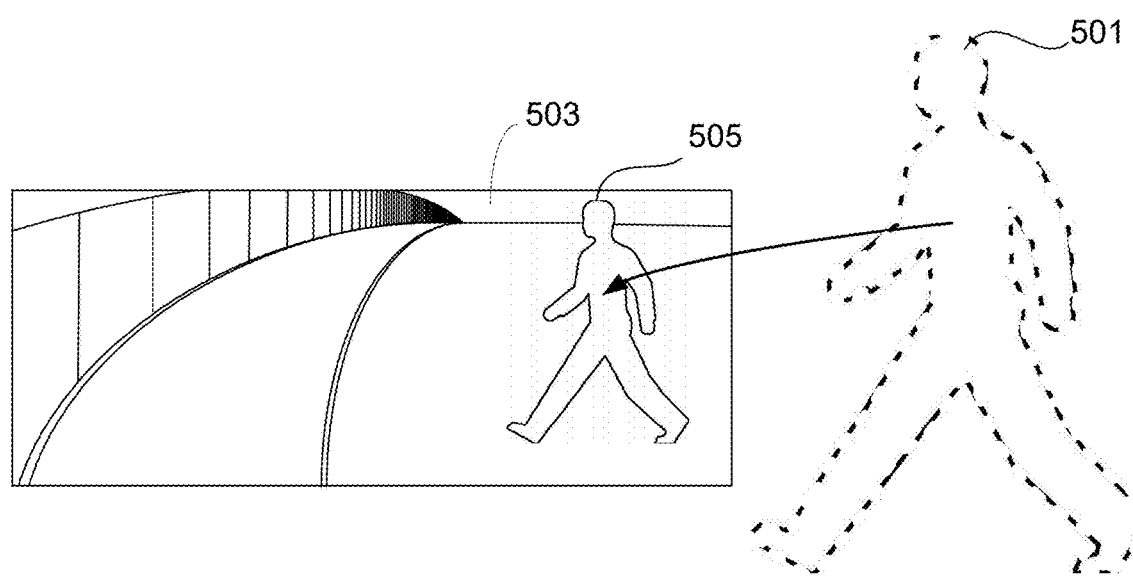
FIG. 5 is a simplified simulated VR scene view showing a notification of entry of a person into, and movement within, the physical space surrounding a VR headset in accordance with an embodiment of the disclosed principles.

As noted in overview above, such an alert may take one of various available forms. Various examples are shown schematically in FIGS. 5-6. For example, in an embodiment, the notification may be as shown in FIG. 5, that is, an overlay of the thermal signature or individual image or video itself on the current VR display, enabling the headset to show the presence of others without destroying the VR experience. In a further embodiment, the user may be alerted using one or more speakers associated with the VR headset.

In the illustrated embodiment, a person 501 has entered the VR user's physical environment, e.g., the room in which they are playing. However, since the VR user is wearing a VR headset displaying a VR scene 503, the VR user would not normally be aware of the presence of the person 501. However, in the illustrated embodiment, an image 505 of the person 501 or their thermal signature is superimposed on the VR scene 503. In this way, the VR user is made aware of the person 501 without needing to exit the VR experience.

It will be appreciated that a distinctive style, shade, label etc. may or may not be used for the image 505 to distinguish the image 505 from other VR imagery being displayed ion the scene 503. The image 505 may be photographic, line form (as illustrated), or static, e.g., a badge or icon. Furthermore, the image 505 and may move in accordance with person 501, at the level of body segments or at a rougher level such as merely mirroring overall position.

In an embodiment, the VR headset identifies the person 501 and assigns a label to the image 505 that reflects the identity of the person 501. Such identification may be based on identifying user characteristics such as height, outline, speech characteristics and so on, or based on identification of a device associated with the person 501.

Figure 6:
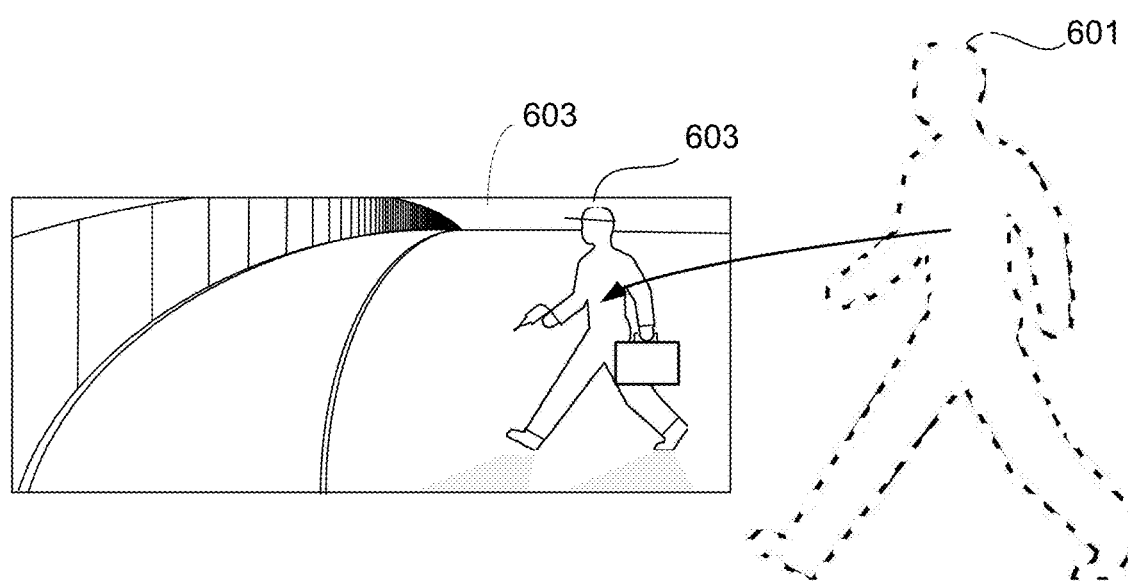
FIG. 6 is a simplified simulated VR scene view showing a notification of entry of a person into, and movement within, the physical space surrounding a VR headset in accordance with an alternative embodiment of the disclosed principles.

In yet another embodiment, shown in FIG. 6, a notification of the additional person 601 is given by presenting an additional character or entity 605 within the current VR scene 603 being displayed by the headset. In this embodiment, rather than showing an image of the person 601 that is linked to their physical appearance, the VR headset shows the person 601 as a character or actor in the displayed scene 603. Thus, as shown, the image 605 may appear to be part of the VR scene 503, including shadowing, implements, skins and textures and so on. Indeed, the image 605 in this embodiment may look nothing like the person 601 other than in location and pose. For example, the image 605 may show a dragon, superhero, animal etc.

An additional option is to pause or stop the VR display and allow a camera view to be shown rather than the VR scene 503, 603. This may utilize a phone camera or built-in headset camera. Another optional embodiment entails using thermalpile sensors to transform other local players, not just temporary intruders, into game action figures, with continued motion tracking.

Although the examples herein employ a single pane scene view for clarity, it will appreciated that a VR headset may display a scene by displaying a slightly different version of the scene to each eye simultaneously, e.g., to provide stereoscopic depth and the sensation of 3D. Moreover, it will be appreciated that the described techniques are especially useful within VR environments, the same principles may be applied equally in non-VR environments.

It will be appreciated that various systems and processes for virtual reality presence monitoring and notification have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of low power virtual reality (VR) presence monitoring and notification via a VR headset worn by a user, the method comprising:
    monitoring one or more sensors associated with the VR headset for thermal activity in the vicinity of the user;
    detecting thermal activity in the vicinity of the user based on the one or more monitored sensors;
    determining whether the detected thermal activity is moving;
    analyzing the thermal activity to determine whether it is characteristic of an animate being if the detected thermal activity is moving; and
    generating a visual alert to the user via the VR headset representative of a source of the thermal activity if the thermal activity is characteristic of an animate being.

2. The method in accordance with claim 1, wherein the one or more sensors associated with the VR headset comprise one or more thermopile sensors.

3. The method in accordance with claim 1, wherein for thermal activity is considered to be in the vicinity of the user if it is within range of the one or more sensors associated with the VR headset in a direction that the VR headset is pointing.

4. The method in accordance with claim 1, wherein generating a visual alert to the user via the VR headset additionally comprises generating an audio alert.

5. The method in accordance with claim 1, wherein generating a visual alert to the user via the VR headset representative of a source of the thermal activity comprises generating an image of the source of the thermal activity.

6. The method in accordance with claim 5, wherein the image of the source of the thermal activity is an outline image.

7. The method in accordance with claim 5, wherein the image of the source of the thermal activity is a thermal image.

8. The method in accordance with claim 5, wherein the image of the source of the thermal activity is a photographic image.

9. The method in accordance with claim 5, wherein the image of the source of the thermal activity shows a VR character having the pose and relative location of the source of the thermal activity.

10. The method in accordance with claim 1, further comprising continuing to monitor the pose and location of the source of the thermal activity and continuing to update the visual alert based on the pose and location of the source of the thermal activity.

11. A system for low power virtual reality presence monitoring and notification comprising: a virtual reality (VR) headset configured to be worn by a user, the VR headset including one or more display units, one or more sensors and a processor configured to detect thermal activity in the vicinity of the VR headset based on the one or more sensors, determine whether the detected thermal activity is moving, determine whether the thermal activity is characteristic of an animate being if the detected thermal activity is moving, and generate a visual alert via the one or more display units representative of a source of the thermal activity if the thermal activity is characteristic of an animate being.

12. The system in accordance with claim 11, wherein the one or more sensors associated with the VR headset comprise one or more thermopile sensors.

13. The system in accordance with claim 11, wherein for thermal activity is considered to be in the vicinity of the user if it is within range of the one or more sensors associated with the VR headset in a direction that the VR headset is pointing.

14. The system in accordance with claim 11, wherein generating a visual alert to the user via the VR headset additionally comprises generating an audio alert.

15. The system in accordance with claim 11, wherein generating a visual alert to the user via the VR headset representative of a source of the thermal activity comprises generating an image of the source of the thermal activity.

16. The system in accordance with claim 15, wherein the image of the source of the thermal activity is one of an outline image, a thermal image and a photographic image.

17. The system in accordance with claim 15, wherein the image of the source of the thermal activity shows a VR character having a pose and relative location consistent with the source of the thermal activity.

18. The system in accordance with claim 11, wherein the processor is further configured to monitor a pose and location of the source of the thermal activity and to update the visual alert based on changes in the pose and location of the source of the thermal activity.

* * * * *